2 Sheets—Sheet 1.
P. McMACKIN.
Dry Closet.
No. 202,278.      Patented April 9, 1878.
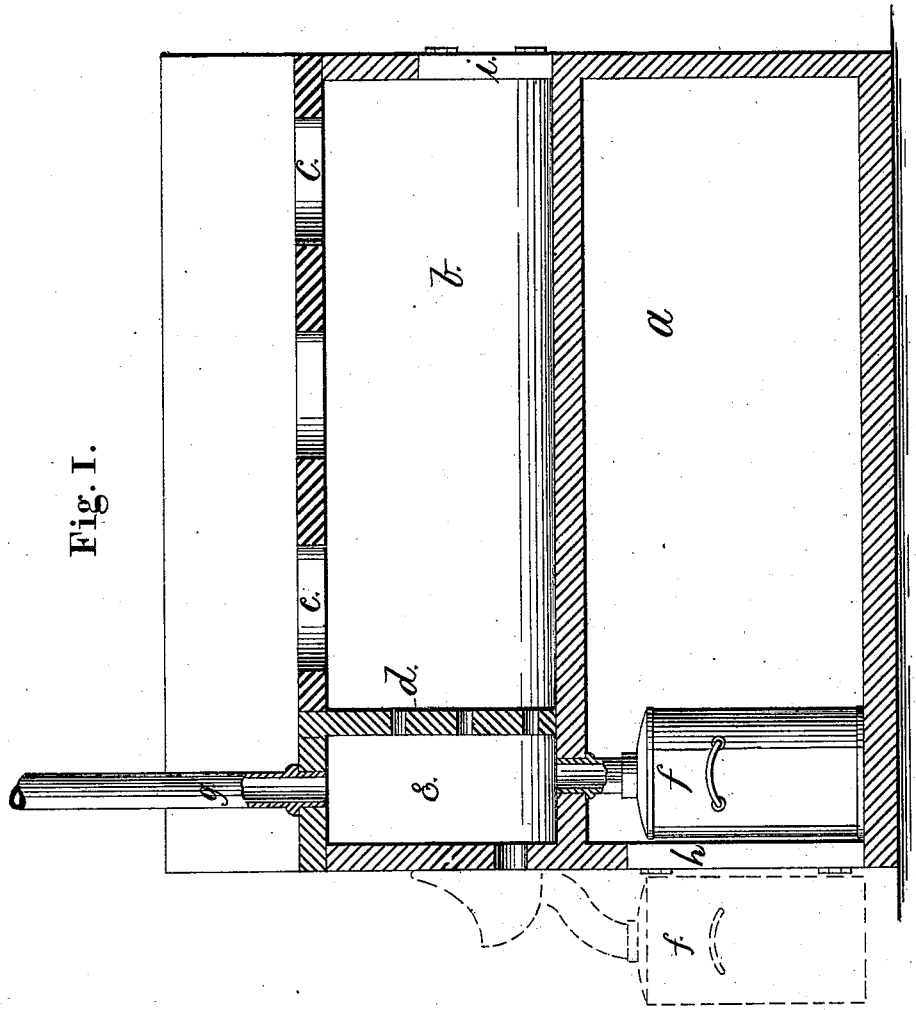
Fig. I.
WITNESSES:
Joseph A. Miller Jr
William L. Roof.
INVENTOR:
Peter McMackin
by Joseph A. Miller
Attorney

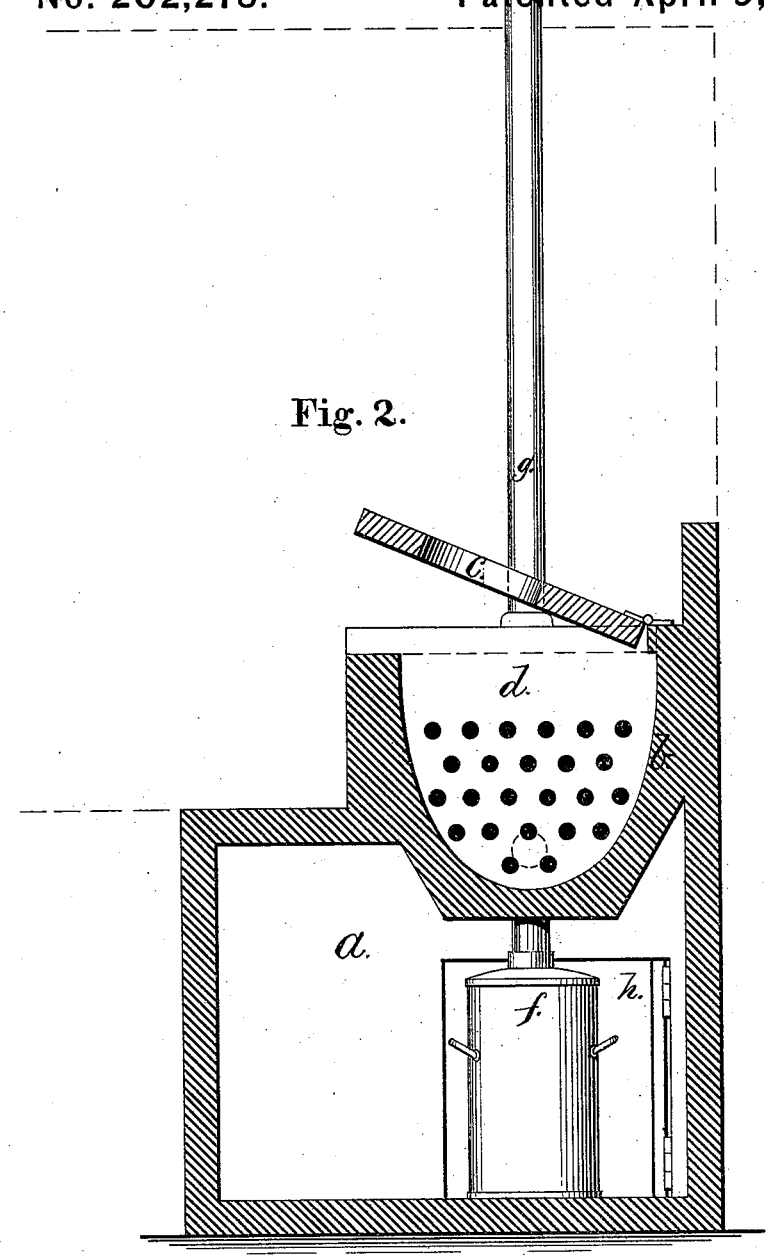

UNITED STATES PATENT OFFICE.

PETER McMACKIN, OF LONSDALE, RHODE ISLAND.

IMPROVEMENT IN DRY-CLOSETS.

Specification forming part of Letters Patent No. 202,278, dated April 9, 1878; application filed February 25, 1878.

*To all whom it may concern:*

Be it known that I, PETER McMACKIN, of Lonsdale, in the county of Providence and State of Rhode Island, have invented new and useful Improvements in Dry-Closets; and I hereby declare that the following is a full, clear, and exact description of the same, reference being had to the accompanying drawings, forming part of this specification.

The object of this invention is to separate the liquid from the solid portion of the fœces in a closet, and thus retard decomposition, and also prevent the infiltration of the liquid manure into the soil and the contamination of wells.

The invention consists in the peculiar and novel arrangement of a dry-closet raised above a vault, and provided with a perforated partition, through which the liquid portion is allowed to escape and be collected in a portable receptacle.

Figure 1 is a sectional view of the improved closet, showing the main receptacle, the liquid-receiver, the perforated partition, and ventilating-pipe in solid lines, and also, in broken lines, the position of the liquid-receiver when placed outside of the closet proper. Fig. 2 is a cross-section of the same, showing the relative position of the several parts.

In the drawings, $a$ is the vault proper. $b$ is a receiving-chamber, made of some non-absorbent material, or lined with such a material as will not absorb either the moisture or gases from the fœces—such material as is used in water-closets, or other suitable material.

$c$ represents the seats. $d$ is a perforated partition, separating the space $e$ from the receiving chamber or vessel $b$. The space $e$ connects by a pipe with the portable liquid-receiver $f$, and is provided with the ventilating-pipe $g$. The space $e$ may be filled with charcoal or other disinfectant or absorbent material.

If required, the portable liquid-vessel $f$ may be placed outside the vault, as shown in Fig. 1 in broken lines. $h$ is a door in the vault proper, and $i$ a door for cleaning the receiving-chamber $b$.

When in use, the fœces in the receiving-chamber $b$ allow all the liquid to drain through the perforated partition into the portable vessel $f$, and the dry matter will be from time to time covered with dry earth, dust, or ashes, and thus a valuable compost secured free from offensive odors, which can be readily removed through the door $i$, and can be stored in the vault $a$, and as all the liquid is stored in the portable vessel $f$, this can be readily removed; and as the space $e$ is provided with a ventilating pipe or chimney, and this space is connected by the perforations in the partition $d$, the indraft of air will pass over the fœces or excrement through the perforations in the partition $d$ and up the flue or chimney $g$, assisting in drying the fœces and preventing obnoxious smells. The liquid is prevented from entering the soil and filtering into wells, causing so many of the diseases now prevalent where the old closets are in use, while the dry fœces form a valuable manure, which can be removed without the unpleasant smells now accompanying such removal from the ordinary closet, thus insuring health, comfort, and cleanliness.

Having thus described my invention, I claim as new and desire to secure by Letters Patent—

1. The combination, with the chamber $b$, provided with suitable seats, and the door $i$, of the perforated partition $d$, space $e$, and portable liquid-receiving vessel $f$, arranged and operating substantially as and for the purpose described.

2. The combination, with the vault $a$, of the receiving-chamber $b$, the perforated partition $d$, space $e$, portable liquid-vessel $f$, and ventilating-flue $g$, arranged substantially as and for the purpose described.

3. In a dry-closet, the combination, with the receiving-chamber $b$, of the perforated partition $d$, arranged to drain the liquid from the solid fœces, and the door $i$, for removing the same, substantially as and for the purpose described.

PETER McMACKIN.

Witnesses:
JOSEPH A. MILLER,
JOSEPH A. MILLER, Jr.